UNITED STATES PATENT OFFICE.

JAMES T. HACKING, OF PAWTUCKET, RHODE ISLAND.

PLATEN-RENEWER.

1,373,559.     Specification of Letters Patent.     Patented Apr. 5, 1921.

No Drawing.     Application filed October 5, 1920. Serial No. 414,918.

*To all whom it may concern:*

Be it known that I, JAMES T. HACKING, a citizen of the United States, residing at Pawtucket, in the county of Providence and State of Rhode Island, have invented certain new and useful Improvements in Platen-Renewers, of which the following is a specification.

My invention relates to a liquid preparation adapted to be applied to the surface of a platen for typewriters and other machines of analogous character.

The essential objects of my invention are to renew and preserve the platen, to enliven the material of the same, to fill the dents therein, and to preserve the material of the platen in a pliable condition.

To the above ends essentially my invention consists in such ingredients and in such combinations of ingredients as fall within the scope of the appended claims.

In compounding my novel preparation I mix denatured alcohol, heavy resin oil, and oil of lavender flower, and allow the mixture to stand until the oils are completely dissolved.

The approximate quantities of the ingredients found by me to be particularly effective are $91\frac{1}{2}\%$ denatured alcohol, 8% heavy resin oil, $\frac{1}{2}\%$ of lavender flower.

It will be understood that the indicated relative quantity of ingredients may be changed within reasonable limits without destroying the efficiency of the mixture. The oil of lavender may be omitted without seriously impairing the efficiency of the mixture.

A maximum degree of efficiency is attained by preparing the denatured alcohol as follows. Allow ordinary denatured alcohol with a small quantity of quick lime therein to stand for a period of approximately 12 hours and then decant the alcohol. This removes all foreign substances from the alcohol such as water and increases its susceptibility for absorbing the other materials employed therewith in my novel preparation, and imparts additional penetrating qualities when applied to the rubber constituting the face of the platen.

My novel preparation is applied to the platen by rubbing the rubber surface of the latter with a piece of cloth saturated with the liquid and allowing the latter to dry. The drying is immediate or within a less period than one minute.

I claim:—

1. A preparation for restoring the surface of a platen, which consists of a mixture of alcohol and resin oil.

2. A preparation for restoring the surface of a platen, which consists of dehydrated denatured alcohol mixed with heavy resin oil.

3. A preparation for restoring the surface of a platen, which consists of a mixture of alcohol, resin oil, and oil of lavender flower.

4. A preparation for restoring the surface of a platen consisting of $91\frac{1}{2}\%$ dehydrated denatured alcohol, 8% heavy resin oil, and $\frac{1}{2}\%$ oil of lavender flower.

In testimony whereof I have affixed my signature.

JAMES T. HACKING.